Figure 1:
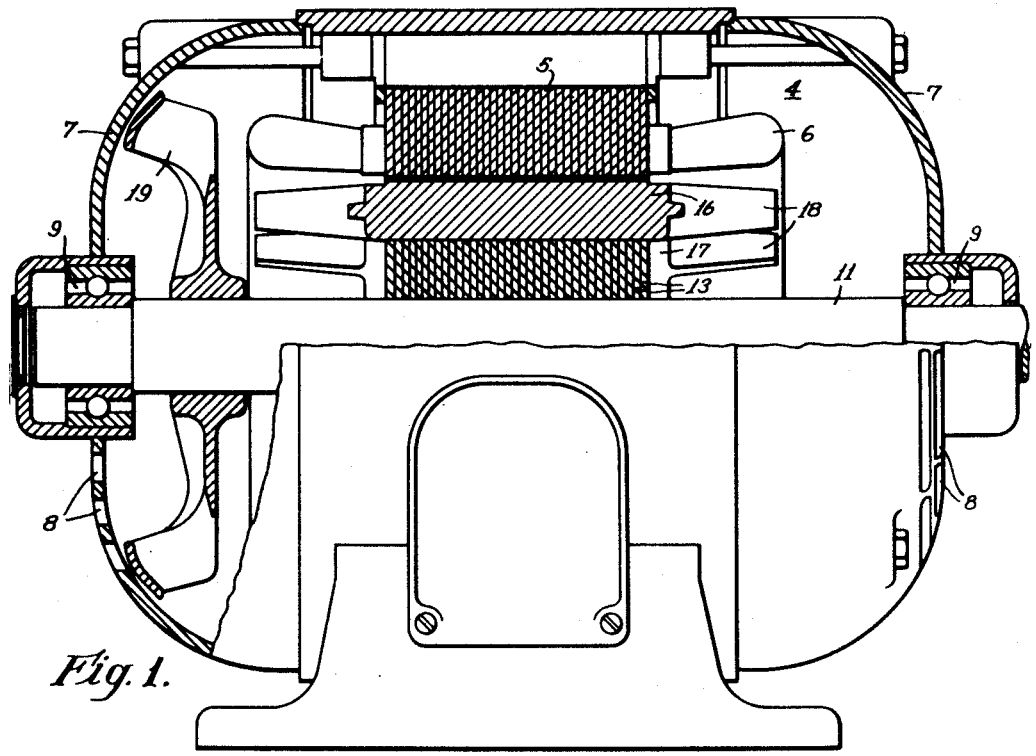

Oct. 31, 1950     L. R. LUDWIG ET AL     2,528,154
SHRUNK ROTOR FOR SQUIRREL-CAGE MOTORS

Filed March 13, 1947

WITNESSES:
Edward Michaels
Wm. C. Groome

INVENTORS
Leon R. Ludwig &
William H. Formhals.
BY
O. B. Buchanan
ATTORNEY

Patented Oct. 31, 1950

2,528,154

UNITED STATES PATENT OFFICE 2,528,154

SHRUNK ROTOR FOR SQUIRREL-CAGE MOTORS

Leon R. Ludwig and William H. Formhals, Buffalo, N. Y., assignors to Westinghouse Electric Corporation, East Pittsburgh, Pa., a corporation of Pennsylvania Application March 13, 1947, Serial No. 734,378

5 Claims. (Cl. 172—120)

Our invention relates to a new structure and method for providing a squirrel-cage motor having decreased stray-load loss, decreased rotor $I^2R$ loss, and decreased dips in the speed-torque curve.

In the development of an entirely redesigned line of squirrel-cage induction motors, the Engineering Department of our assignee, the Westinghouse Electric Corporation, investigated several methods of reducing the stray-load loss in motors; and the best method, which constitutes the subject-matter of our present application, involves the heating of the entire rotor-core, with its cast squirrel-cage winding-structure in place, before putting said rotor-core on the shaft of the motor.

This treatment resulted in a rotor in which the squirrel-cage bars broke away from the steel-core laminations, because of the different rates of thermal expansion of the aluminum of the bars and the steel of the core, so that these two metals are not in such intimate, interlocking, crack-filling contact with each other. This relative movement of the bars and the core is effective, not only at the surface of the rotor, but also deeper in the core, at the very bottoms of the squirrel-cage bars, and it results in a poorer electrical contact between the bars and the core. It is believed that this loosening of the squirrel-cage bars breaks off tiny fins of the bar-material, which may project out between the core-punchings, due to the die-casting process. At any rate, tests have shown that the new rotors exhibit a greatly increased effectiveness of the skew of the squirrel-cage bars, in minimizing the effects of the harmonics which not only produce some of the stray-load loss, but also produce some of the parasitic torques which result in dips in the speed-torque curve of the motor.

In addition to the foregoing, and possibly other, advantages relative to the motor-performance, the heating of the whole unfinished rotor-core, with the cast squirrel-cage winding-structure in place, before the core is placed on its shaft, offers an important advantage in manufacturing, as it makes possible the shrinking of the core onto the shaft, instead of the older and more expensive method of keywaying both the shaft and the rotor, and pressing them together.

An object of our invention is thus to combine the benefits of an improved, shrunk-rotor, assembly-method, and the improved performance of a heated rotor, in one operation, resulting in a better product at a lower cost.

Figure 2:
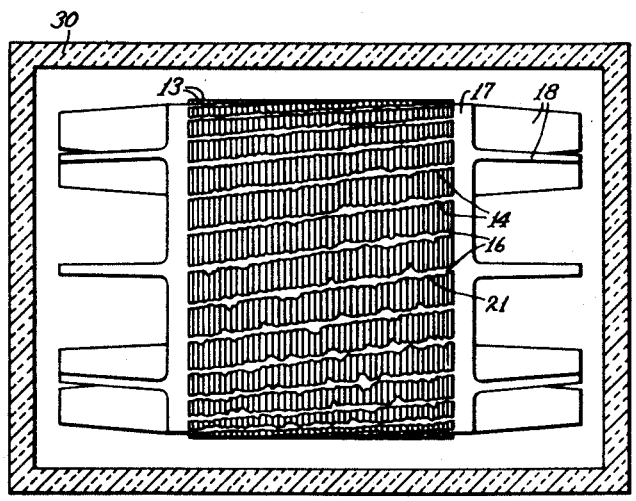
Figure 3:
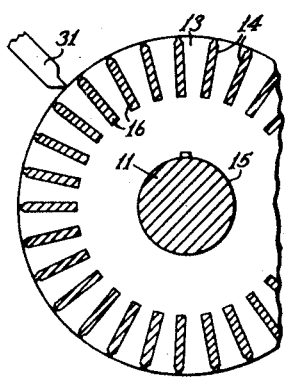

With the foregoing and other objects in view, our invention consists in the structures, combinations, parts, assemblies and methods hereinafter described and claimed, and illustrated in the accompanying drawing, wherein:

Figure 1 is a side view of a motor embodying our invention, with parts in longitudinal section, Fig. 2 is a sectional view through a heating-oven, illustrating the heating of the whole unfinished rotor-core, with a die-cast squirrel-cage winding-structure in place thereon, and Fig. 3 is a cross-sectional view of a finished rotor-member, after the rotor-proper has been shrunk onto the shaft, and illustrating the final turning-operation whereby the outer diameter of the rotor is brought to an accurate dimension, so that the smallest practicable airgap may be utilized in the finished motor.

We show our improved shrunk rotor, by way of example, as being a part of an open, protected motor having a stator-member 4 having a stator-core 5 carrying a three-phase primary winding 6. The stator-member 4 carries two end brackets 7 having ventilating perforations 8 in their lower halves, and having centrally disposed bearings 9 for supporting the shaft 11 of the motor.

The motor-shaft 11 carries the rotor-proper, which consists of a stack of magnetizable steel punchings or laminations 13, having peripheral winding-receiving slots 14 (Fig. 3) and a central shaft-receiving hole 15, and having a die-cast squirrel-cage winding-structure cast integrally therewith in a well-known manner. The cast winding-structure includes squirrel-cage bars 16 which occupy the slots 14, squirrel-cage end-rings 17, and a plurality of axially extending fan-blades 18, all cast integrally in a single die-casting operation, before the rotor-core 13 is placed on the shaft 11.

In accordance with the universal practice, the winding-receiving slots 14 are skewed, as indicated in Fig. 2, for the purpose of reducing the stray-load loss, and reducing the dips in the speed-torque curve of the motor, (thus reducing dead points at starting) and also making the motor quieter in its operation. In using the term "slots," in referring to the peripheral perforations in the punchings for receiving the squirrel-cage bars 16, we mean to include closed slots as well as partially open slots, or any other kind of slots, the usual practice being to utilize partially closed slots, as illustrated in Fig. 3.

Before the die-casting operation, the stack of laminations 13 are assembled in such manner that the slots 14 are skewed, then the squirrel-cage winding-structure 16, 17, 18 is cast integrally with said stack of laminations, and finally the assembly is cooled to set the cast metal, thus completing the process of making the rotor-core, before placing it on its shaft 11.

The motor-shaft 11, in the illustrated form of embodiment of our invention, also carries a fan 19 (Fig. 1) which induces a flow of ventilating-air through the ventilating-openings 8 in the respective brackets 7.

The rotor-proper, as it comes from the die-casting operation, has the material of the squirrel-cage winding-structure intimately bound to the steel punchings of the rotor-core, usually with some of the cast squirrel-cage material spilling over the outside of the partially open slots 14, as indicated at 21 in Fig. 2. We have reason to believe that the squirrel-cage material has a rough contour, which closely fits into the tiny crevices between successive punchings, and into various imperfections and unevennesses of the winding-receiving slots 14 in the punchings, including the corners or tiny angular spaces which are left by the slight circumferential displacements of the slots 14 of successive punchings 13, due to the skewing of the slots in the process of stacking the punchings prior to the die-casting operation, so that a good electrical contact is made between the squirrel-cage bars 16 and the punchings 13.

It has been known, prior to our present invention, to treat the surface of a finished die-cast squirrel-cage rotor, to reduce the short-circuiting of the outer periphery of the rotor-core after the core has been assembled on the shaft. This previously known surface-treating operation was performed after the final turning-operation in which the periphery of the finished rotor was turned down to an accurate diameter, thus removing the excrescences of the casting-material which are shown at 21 in Fig. 2, and producing an accurate, finished rotor-diameter which is necessary in order to obtain a minimum airgap between the stator and the rotor. The previously known surface-treating processes have included surface-etching, surface-treatment by means of a gas flame, and surface-treatment by means of induction heating at a frequency which applies quick heat to only the surface of the rotor-member. In all cases, it operated by a preferential action on the small-dimensioned surface-fins in eating them away, or burning them away, or causing them to curl away by heat-expansion due to their being heated quicker and hotter than the more massive body-portions of the punchings. This surface-treatment, moreover, has been previously applied, so far as we know, only after the rotor-core has been assembled on its shaft, and after the final turning-operation on the outer periphery of the rotor-core.

In accordance with our present invention, we heat-treat the unfinished rotor after the die-casting operation, but before the assembly of the rotor on its shaft, and before the final turning-operation. Our heat-treating process is applied to the entire unfinished rotor, so that the rotor-core is heated all the way through. This necessitates the substitution of an oxide-coating, enamel, or other forms of interlaminar core-insulation, in lieu of sodium-silicate insulating-films between the rotor-punchings, although these films have sometimes been considered to be a desirable practice in the assembly of the stack of steel punchings which comprise the rotor-core 13. The sodium-silicate punching-insulation has to be avoided, in our invention, because it cannot withstand the temperatures reached in our heat-treating operation, without crystallization, which would impose strains on the magnetic material. However, satisfactory cores have frequently been made, heretofore, without sodium-silicate insulation, and we have found that our invention results in a motor having superior all-over performance.

Our rotor-heating operation may be performed by any means which heats through the entire rotor-core, with its attached die-cast squirrel-cage winding-structure, to a temperature sufficient for shrinking the rotor-member about its shaft. It is desirable to make sure that the core is heated through, down to the bottoms of the squirrel-cage bars 16 in the slots 14, and it is also desirable to heat through the rotor-core so that the laminations or punchings are heated all over. It is believed that this heating of the iron or steel punchings may improve the inter-laminar resistance between them, by changing either the area or the chemical composition of the contact-points between successive laminations. By way of illustration, we have illustrated this heating-process as being carried out in an oven 30, as shown in Fig. 2.

The squirrel-cage winding-structure is made of some suitable casting-metal having a reasonably good electrical conductivity, usually aluminum. At any rate, the squirrel-cage material is always a metal which is different from the metal of the rotor-core punchings, and which has a different rate of heat-expansion.

The principal effect of the heating is to cause the squirrel-cage bars 16, and the excrescences 21, to be loosened from the iron or steel laminations, by reason of the different rates of thermal expansion of the two metals. This breaks off the surface-roughnesses of the aluminum squirrel-cage bars 16, so that these squirrel-cage bars 16 no longer have integral parts or protuberances or roughnesses which tightly interlock, in crack-filling contact, with the surfaces of the winding-receiving slots 14 of the rotor-core 13.

The heating may also cause the formation, or increase the amount, of an oxide of aluminum on the surfaces of the squirrel-cage bars 16, thus increasing the resistance between the bars and the core, producing benefits similar to the unequal thermal expansions.

An important advantage of the heating-operation, as applied to the die-cast squirrel-cage rotor-core structure, is that it makes possible the immediate application of the heated rotor-core to the motor-shaft 11, so that the rotor-core, upon cooling, will be secured to the shaft by means of a shrunk fit, which is a much less expensive assembly-method than the older method which required the keywaying of both the shaft and the rotor, and pressing them together. It is quite probable, also, that the act of cooling or shrinking may cause some relative movement between adjacent punchings, as each punching shrinks individually into a tight shrink-fit with the shaft, and this frictional rubbing of the adjacent punchings may serve materially to increase the electrical resistance between the punchings.

After the rotor-proper has been shrunk onto the shaft, and before the rotor-assembly is placed within the stator-member 4, it is practically always necessary, in high-efficiency squirrel-cage motors, to turn the outer periphery of the rotor to an accurate diameter, by rotating the rotor-shaft 11 and applying a cutting-tool 31 to the outer periphery of the rotor-core, as indicated in Fig. 3. This is necessary, in order that the airgap of the motor may be held to the smallest practicable length. Heretofore, it has been believed, by many engineers in the art, that the dragging effect of the cutting-tool 31 would draw some of the softer aluminum, or other bar-material, across the outer surface of the finished rotor, in such manner as to short-circuit the punchings at this peripheral surface, and that is the principal reason why the previously mentioned surface-treating operation has been performed, after the final turning or cutting-operation. In our rotors, we have found that this final surface-treating operation is usually not necessary, probably because the aluminum has already been broken away from its most intimate contact with the steel punchings by reason of the previous through-and-through heating-operation, as already described.

After the turning-operation which is illustrated in Fig. 3, the finished rotor is assembled in the stator-member, as shown and described in connection with Fig. 1.

As previously noted, our motor combines an improved performance with a lower manufacturing-cost.

While we have illustrated our invention as being applied to only one particular type of squirrel-cage motor, and while we have illustrated the heating-process as being carried out by only one particular kind of heating-means, we wish it to be understood that our invention is not limited to these details, and we desire that the appended claims shall be accorded the broadest construction consistent with their language.

We claim as our invention:

1. A squirrel-cage induction motor having a stator member carrying a primary winding, a shaft, and a shrunk rotor-member having a shrunk fit on the shaft, said rotor-member being heated to a suitable shrinking-temperature, and subsequently cooled, in fitting it on the shaft, said rotor-member comprising a stack of laminations having peripheral winding-receiving slots and a central shaft-receiving hole, and having a cast squirrel-cage winding-structure cast integrally therewith, the laminations and the squirrel-cage winding structure being of different metals having different rates of heat-expansions, the heat-expansion rates being so different that the heating and cooling of the rotor-member, incident to shrinking it on the shaft serves to cause the two dissimilar metals to break away from each other, so as not to be in such intimate, interlocking, crack-filling contact with each other.

2. The invention as defined in claim 1, characterized by the slots being skewed to reduce the effects of harmonics which produce stray-load loss and parasitic torques.

3. A method of manufacturing a cast squirrel-cage rotor-member for an induction motor, comprising the steps of assembling a stack of laminations having peripheral winding-receiving slots, casting a squirrel-cage winding-structure integrally with said stack of laminations, cooling the assembly to set the cast metal, heating the whole rotor-member throughout at some time after the casting-operation and to a temperature sufficient for shrinking the rotor-member about its shaft, placing the heated rotor-member on the shaft, and cooling the rotor-member to shrink it on the shaft, the laminations and the squirrel-cage winding-structure being of different metals having different rates of heat-expansion, the heat-expansion rates being so different that the heating and cooling of the rotor-member, incident to shrinking it on the shaft, causes the two dissimilar metals to break away from each other, so as not to be in such intimate, interlocking, crack-filling contact with each other.

4. The invention as defined in claim 5, characterized by the stack being assembled in such manner that the slots are skewed.

5. The invention as defined in claim 5, including the step of subsequently machining the outer periphery of the rotor-member, after shrinking the rotor-member on the shaft.

LEON R. LUDWIG.
WILLIAM H. FORMHALS.

REFERENCES CITED

The following references are of record in the file of this patent:

UNITED STATES PATENTS

| Number | Name | Date |
|---|---|---|
| 1,925,052 | Larsh | Aug. 29, 1933 |
| 1,934,981 | Johnson | Nov. 14, 1933 |
| 1,982,424 | Fahlman | Nov. 22, 1934 |

FOREIGN PATENTS

| Number | Country | Date |
|---|---|---|
| 459,295 | Great Britain | Jan. 5, 1937 |